(12) United States Patent
Richey

(10) Patent No.: US 12,167,251 B2
(45) Date of Patent: *Dec. 10, 2024

(54) RF CERTIFICATION SYSTEM AND METHOD

(71) Applicant: Ralph R. Richey, Saint George, UT (US)

(72) Inventor: Ralph R. Richey, Saint George, UT (US)

( * ) Notice: Subject to any disclaimer, the term of this patent is extended or adjusted under 35 U.S.C. 154(b) by 604 days.

This patent is subject to a terminal disclaimer.

(21) Appl. No.: 17/223,553

(22) Filed: Apr. 6, 2021

(65) Prior Publication Data

US 2021/0329471 A1    Oct. 21, 2021

Related U.S. Application Data

(63) Continuation of application No. 16/854,632, filed on Apr. 21, 2020, now Pat. No. 10,999,744.

(51) Int. Cl.
*H04W 16/20* (2009.01)
*H04W 24/02* (2009.01)
*H04W 64/00* (2009.01)
*H04M 1/724* (2021.01)
*H04M 1/72403* (2021.01)
*H04W 88/02* (2009.01)

(52) U.S. Cl.
CPC ........... *H04W 16/20* (2013.01); *H04W 24/02* (2013.01); *H04W 64/003* (2013.01); *H04M 1/724* (2021.01); *H04M 1/72403* (2021.01); *H04W 88/02* (2013.01)

(58) Field of Classification Search
CPC ... H04W 16/20; H04W 24/02; H04W 64/003; H04W 88/02; H04M 1/724; H04M 1/72403
See application file for complete search history.

(56) References Cited

U.S. PATENT DOCUMENTS

| | | | | |
|---|---|---|---|---|
| 8,249,598 B1 * | 8/2012 | Khanka | ............. | H04W 36/0061 370/335 |
| 2020/0374014 A1 * | 11/2020 | Bendlin | ............. | H04B 17/0085 |

* cited by examiner

*Primary Examiner* — Wayne H Cai
(74) *Attorney, Agent, or Firm* — Holland & Hart LLP

(57) ABSTRACT

A method and system of certifying RF coverage in a structure. A grid is superimposed on a floor plan of a structure to be certified. Each sector in the grid is given an identifier. A test unit is placed in one of the sectors. An RF test signal is transmitted from the test unit to a base unit located outside the structure. The RF test signal as received by the base unit is analyzed to determine whether it is satisfactory. An RF reply signal is transmitted from the base unit to the test unit. The reply signal as received by the test unit is analyzed to determine whether it is satisfactory. This process is repeated for each sector of the grid.

4 Claims, 19 Drawing Sheets

RF CERTIFICATION SYSTEM AND METHOD

CROSS-REFERENCE TO RELATED APPLICATIONS

This application is a continuation of U.S. patent application entitled "RF Certification System And Method," Ser. No. 16/854,632, filed Apr. 21, 2020, which application is hereby incorporated by reference in its entirety. It is to be understood, however, that in the event of any inconsistency between this specification and any information incorporated by reference in this specification, this specification shall govern.

FIELD OF THE INVENTION

This invention is in the field of radio communications and more particularly in the field of RF communications into and within buildings.

BACKGROUND

Wireless communications are essential in today's society to support law enforcement, emergency medical treatment, firefighting, disaster relief, and other governmental and private service providers. The individuals who provide these services must be able to communicate reliably and accurately with each other and with their bases of support or other remotely-located facilities in order to function effectively or even at all. Often these services must be performed inside structures including for example commercial and government office buildings, courthouses, hospitals, schools, and retail stores.

FIG. 1 shows a building 100 having a basement 102 below ground level 104, a first floor 106 at ground level, and second through fifth floors 108, 110, 112, and 114. An RF transceiver 116, for example a cell tower, a police or fire-service dispatch station, or other transceiver operating in any of the wavelengths used for two-way radio communications, transmits signals that must be receivable by personnel in the structure. The transceiver 116 must also be able to receive signals transmitted from within the structure, for example by personnel using portable transceivers, cellphones, or the like.

As indicated by RF coverage area 118, there is clear signal passage between the transceiver 116 and portions of the building 100, specifically the third floor 110, most of the fourth floor 112, and a portion of the fifth floor 114. However, a small portion 120 of the fourth floor 112, and a larger portion 122 of the fifth floor 114, as indicated by RF coverage area 118, do not have adequate coverage. This may be due to such factors as distance from the transceiver 116, or walls or other structural members of the building 100.

In addition, another building 124 is located between the building 100 and the transceiver 116. The building 124 attenuates signals between the transceiver 116 and portions of the building 100 including the basement 102 and the first two floors 106 and 108.

If this need for availability of reliable radio communication at any time and often with no advance notice is taken into account during building design and construction, various steps can be taken to ensure that adequate signal coverage will be provided. Building codes in many municipalities now require that a newly-constructed building be certified as providing adequate RF signal passage in wavelengths used for two-way radio communications before the building will be approved for occupancy.

Certification is typically carried out by an inspector who walks through the building carrying a portable test transceiver, making transmissions back to a remotely-located base station at each of a plurality of locations in the building. A person at the base station notes the quality of the received signal for each transmission. Some codes require at least one transmission in each 15-square-foot (1.4-square-meter) sector of each floor. An example of apparatus that may be used for such certification is described in Anritsu Application Note "In-building Mapping with the Anritsu S412E LMR Master and the MA8100A Series TRX Neon Signal Mapper", Anritsu Company, 2016.

SUMMARY

The Applicant believes that he has discovered various problems with the methods and apparatus that have been used for certification of RF signal operability in a building. These methods are labor-intensive in that one inspector must move throughout the building, often guessing at the locations of various sectors on each floor, while a second person remains by the receiver in the base station. The second person must manually observe signal strength, data integrity, or other indications of successful or unsuccessful communication and then record this information. Once recorded, the information must be compiled into a report indicating whether the building has passed the test. These and other problems are overcome by embodiments of the present invention.

Briefly and in general terms, a method of certifying RF coverage in a structure begins with superimposing a grid on a floor plan and assigning an identifier to each sector in the grid. Then an inspector places a test unit in one of the sectors. The test unit may display the grid to facilitate placement of the test unit. The test unit transmits an RF test signal to a base unit located outside the structure. The RF test signal as received by the base unit is analyzed to determine whether it satisfies a first predetermined criterion. An RF reply signal is transmitted from the base unit back to the test unit. The RF reply signal as received by the test unit is analyzed to determine whether it satisfies a second predetermined criterion. This process is thereupon repeated for each sector.

A log of received test signals may be maintained, including whether each received test signal satisfied the first criterion. This log may be maintained by the base unit, or by the test unit, or by another data processing system. Similarly, a log of received reply signals may be maintained, including whether each such signal satisfied the second criterion. The base unit or another system may prepare a report listing sectors for which the received test signals satisfied the first criterion and sectors for which the received reply signals satisfied the second criterion.

The floor plan may be input directly into the test unit when the test is begun, and the test unit may generate the grid and identifiers for each sector. Or these functions may be carried out elsewhere ahead of time. The test unit may visually display the sector in which the test unit is located and the sector identifier, or it may display some or all of the floor plan with the sector identifier superimposed.

The first criterion may be simply whether the received test signal has at least a desired minimum amplitude (signal strength). Or the test signal may be modulated with an analog signal, and the first criterion may be whether the quality of the analog signal as reproduced when the test signal is received at the base unit is satisfactory. Or the test signal may be encoded with data, for example the sector identifier, and the first criterion may be whether the data are accurately recovered when the test signal is received at the base unit. The test signal may include both analog modulation and digital encoding, and the received signal may be evaluated against any one or more of these or other criteria.

A log of test signals as received by the base unit may be maintained. This log may include, for example, the identifier of the sector from which each test signal was received and whether the test signal transmitted from that sector satisfied the first criterion.

Similarly, the second criterion may be simply whether the received reply signal has at least a desired minimum amplitude (signal strength). Or the reply signal may be modulated with an analog signal or encoded with data or both. The received reply signal may be evaluated against any of these.

Data encoded into the reply signal may include, for example, the amplitude of the received test signal and whether the test signal satisfied the first criterion.

A log may be maintained of reply signals received by the test unit. This log may include the identifier of each sector in which the reply signal is received, which would normally be the same sector as that from which the test signal was transmitted. The log may include whether the reply signal as received satisfied the second criterion.

The logs may include other information. For example, date and time may be included. The log may include more information than simple pass-or-fail, such as an indication of how much discrepancy there was between a criterion and a failed signal.

A certification system for testing whether a building meets applicable criteria for RF signal coverage includes a test unit and a base unit. The test unit has a sector-identifier input, a test digital encoder in communication with the sector identifier input, and a test RF transmitter in communication with the test digital encoder. A user may input a sector identifier, or the test unit may include a capability of automatically superimposing a grid on a floor plan and assigning identifiers to each sector of the grid. In either case the test unit may digitally encode the sector identifier into a test signal to be transmitted. The test RF transmitter may modulate the test signal with an analog signal. The test unit also has a test RF receiver, a test amplitude detector in communication with the test RF receiver, a test digital decoder in communication with the test RF receiver, and an output in communication with the test digital decoder and the test amplitude detector. The test receiver may receive a reply signal, measure the amplitude of the reply signal, demodulate an analog signal carried by the reply signal, or decode data carried by the reply signal, or all of these.

The base unit has a base RF receiver, a base amplitude detector in communication with the RF receiver, and a base digital decoder in communication with the RF receiver. The amplitude detector may measure the amplitude of the RF test signal as received. The RF receiver may demodulate the received test signal to recover any analog signal carried by the test signal. The digital decoder may recover data from the test signal. The base unit also has a base digital encoder in communication with the amplitude detector and a base RF transmitter in communication with the base digital encoder. The encoder may impress data, for example data indicating whether the received test signal passed the first criterion, onto an RF reply signal, and the base transmitter may modulate the RF reply signal with an analog signal and transmit the reply signal back to the test unit.

The system may include a test memory in communication with the sector identifier input and the test digital decoder, and a base memory in communication with the base amplitude detector and the base digital decoder. These memories may be located in the test unit and the base unit, respectively, or in any other convenient place, and a single physical memory may include both test and base memory functions.

The test unit may include a GPS receiver that may be used to assist in locating the test unit in a desired sector.

The foregoing summary gives but some features and advantages of the invention. Other features and advantages will become apparent from the attached drawings and the following detailed description, illustrating by example various embodiments. However, the invention is to be understood as limited only by the claims as issued, not by anything else herein.

DETAILED DESCRIPTION

Embodiments of a method of RF certification of a structure, for example the building of FIG. 1, and embodiments of systems for RF certification of structures, will now be described.

Figure 2A:
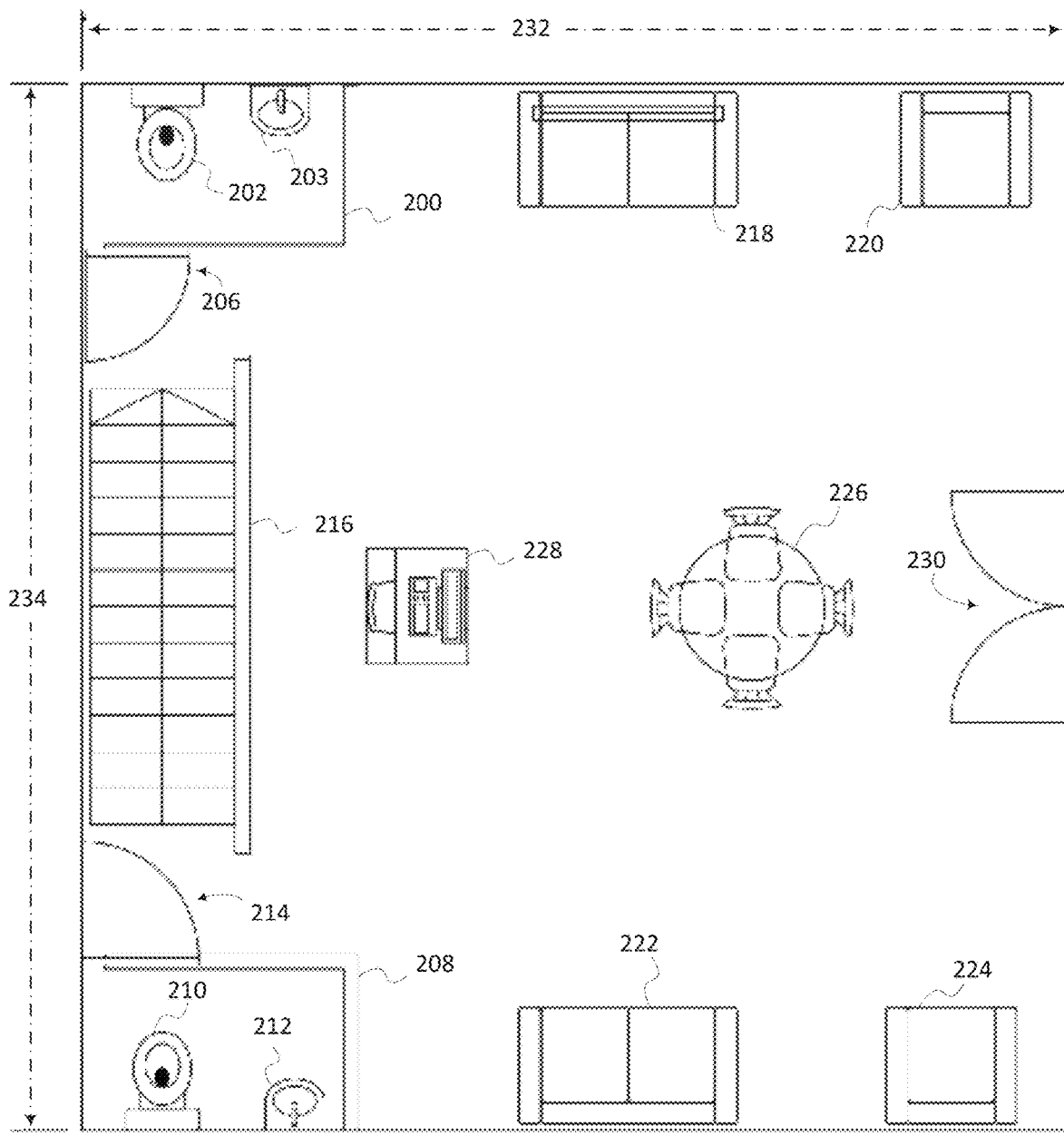
FIG. 2A is a floor plan of a floor in the building of FIG. 1.

FIG. 2A provides an example of a floor plan of one floor in a building to be certified for RF communication coverage. In an upper left corner is a restroom 200 with a commode 202, a lavatory 204, and an entry door 206. In a lower left corner is another restroom 208 with a commode 210, a lavatory 212, and an entry door 214. A staircase 216, left center, leads to another floor (not shown). A sofa 218 and a chair 220 are adjacent the restroom 200, and a sofa 222 and a chair 224 are adjacent the restroom 208. A table-and-chair set 226 is disposed right of center. A reception desk 228 is disposed left of center. An entryway 230 is at right center. The floor has a width 232 and a length 234; the actual dimensions are not important.

Figure 2B:
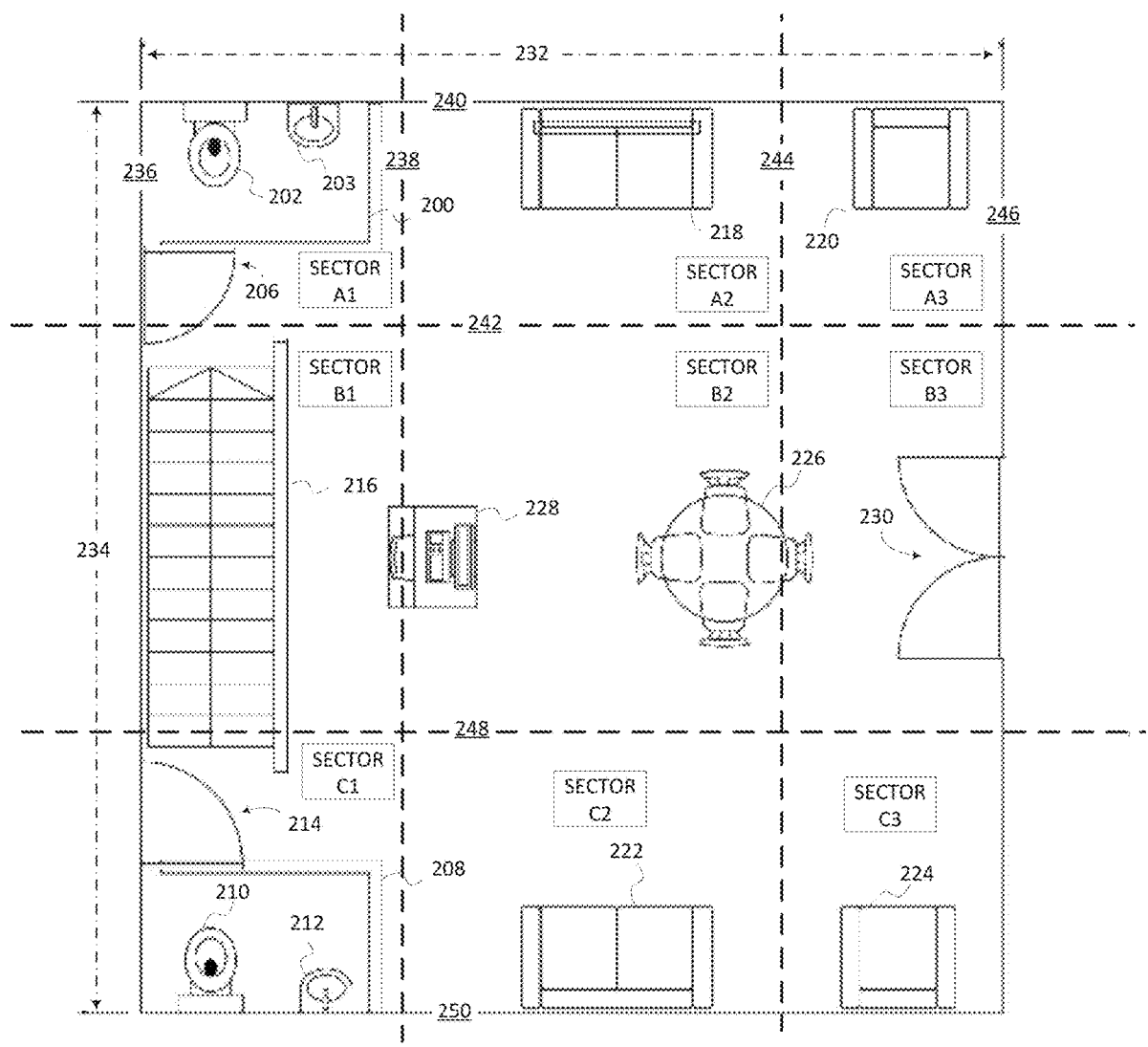
FIG. 2B is the floor plan of FIG. 2A with a superimposed grid that defines sectors.

FIG. 2B shows a 9-sector grid superimposed on the floor plan of FIG. 2A. A grid sector A1, which includes the restroom 200, is defined between a left-hand edge 236 of the building, a vertical grid line 238, a top edge 240 of the building, and a horizontal grid line 242. A grid sector A2, which includes the sofa 218, is defined between the vertical grid line 238, a vertical grid line 244, the top edge 240, and the horizontal grid line 242. A grid sector A3, which includes the chair 220, is defined between the vertical grid line 244, a right-hand edge 246 of the building, the top edge 240, and the horizontal grid line 242.

Similarly, a grid sector B1, which includes the staircase 216, is defined between the left-hand edge 236, the vertical grid line 238, the horizontal grid line 242, and a horizontal grid line 248. A grid sector B2, which includes the table and chair set 226, is defined between the vertical grid lines 238 and 244 and the horizontal grid lines 242 and 248. A grid sector B3, which includes the front entry 230, is defined between the vertical grid line 244, the right-hand edge 246, the horizontal grid line 242, and the horizontal grid line 248. A grid sector C1, which includes the restroom 208, is defined between the left-hand edge 236, the vertical grid line 238, the horizontal grid line 248, and a bottom edge 250 of the building. A grid sector B2, which includes the sofa 222, is defined between the vertical grid lines 238 and 244, the horizontal grid line 248, and the bottom edge 250. A grid sector B3, which includes the chair 224, is defined between the vertical grid line 244, the right-hand edge 246, the horizontal grid line 248, and the bottom edge 250.

In this example the three sectors A1, A2, and A3 form a row identified by the letter "A" and numbered consecutively from left to right. The three sectors B1, B2, and B3 form a row identified by the letter "B" and numbered consecutively from left to right. The three sectors C1, C2, and C3 form a row identified by the letter "C" and numbered consecutively from left to right. Any other convenient system for identifying the sectors may be used as desired to provide each sector throughout the building with a unique identifier.

Figure 1:
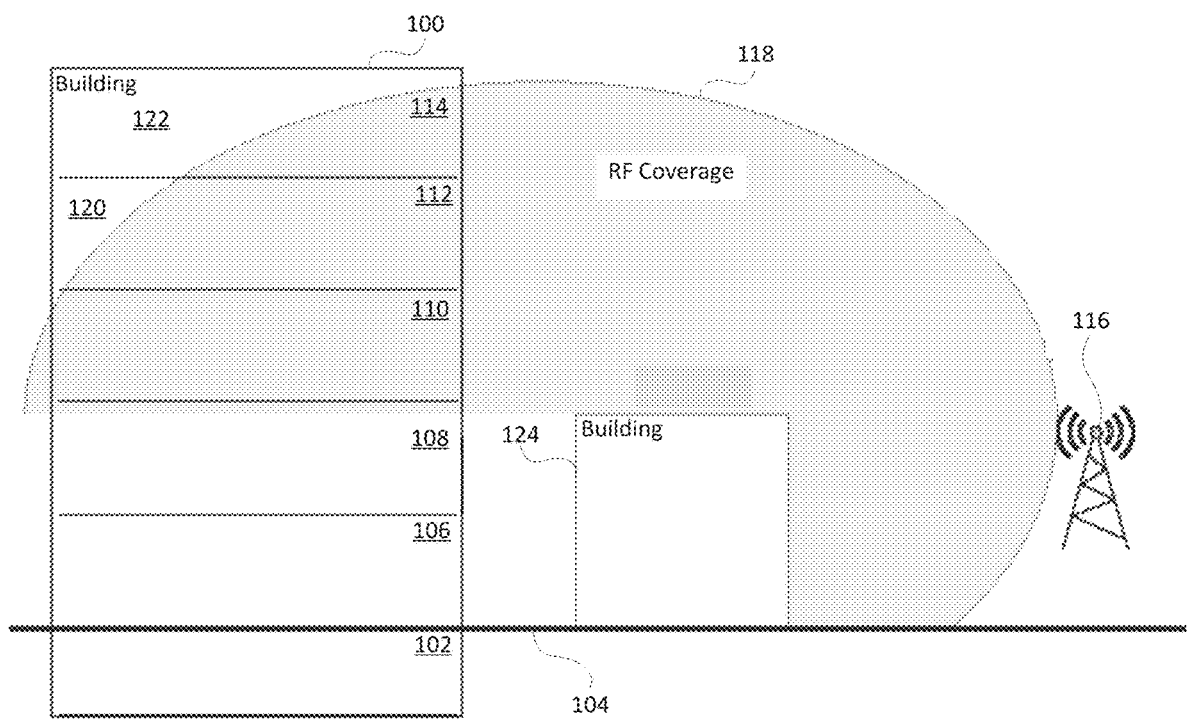
FIG. 1 is a graphic diagram of RF coverage and shadow areas in a building that might be certified according to an embodiment of a method of RF certification.
Figure 3:
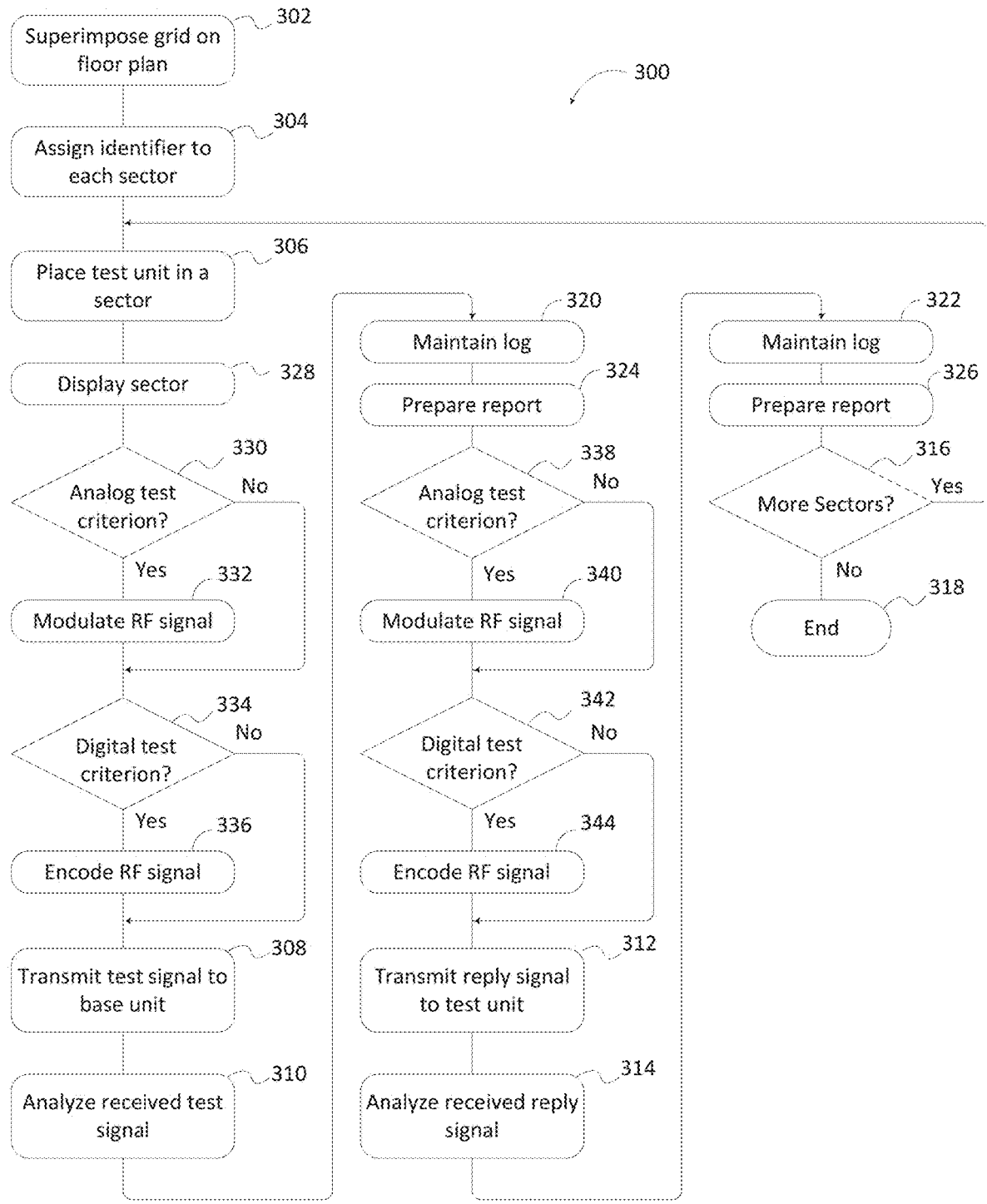
FIG. 3 is a flowchart illustrating an embodiment of a method of RF certification.

FIG. 3 illustrates an embodiment generally 300 of a method of certifying RF coverage in a structure such as the building depicted in FIGS. 1 and 2A. The method includes superimposing 302 a grid such as the grid of FIG. 2B on a floor plan of a structure to be certified; assigning 304 an identifier to each sector in the grid; placing 306 a test unit in one of the sectors of the grid; transmitting 308 an RF test signal from the test unit to a base unit located outside the structure; analyzing 310 the RF test signal as received by the base unit to determine whether it satisfies a first predetermined criterion; transmitting 312 an RF reply signal from the base unit to the test unit; analyzing 314 the RF reply signal as received by the test unit to determine whether it satisfies a second predetermined criterion; and if there are more sectors 316, repeating from 306 to 314 for each sector. When all sectors have been tested, the method ends 318.

Some embodiments also include maintaining 320 a log of received test signals including whether each received test signal satisfied the first criterion or maintaining 322 a log of received reply signals including whether each received reply signal satisfied the second criterion or both. Some embodiments include preparing 324 a report listing those sectors for which the received test signals satisfied the first criterion, preparing 326 a report listing those sectors for which the received reply signals satisfied the second criterion, or both.

Some embodiments include displaying 328 the identifier of the sector in which the test unit is located, or a visual depiction of the sector or of the floor plan. This may be done on a display screen on the test unit or on a separate unit.

If quality of reproduction of an analog signal as received by the base unit is a test criterion 330, some embodiments include modulating 332 the RF test signal with an analog signal. If accuracy of recovery of the data from the RF test signal as received by the base unit is a test criterion 334, some embodiments include encoding 336 the RF test signal with data. This data may comprise the identifier of the sector in which the test unit is located when the RF test signal is transmitted.

If quality of reproduction of an analog signal as received by the test unit in a reply is a test criterion 338, some embodiments include modulating 340 the RF reply signal with an analog signal. If accuracy of recovery of data as received by the test unit is a test criterion 342, some embodiments include encoding 344 the RF test signal with data. This data may comprise the identifier of the sector in which the test unit is located when the RF test signal is transmitted, or it may include the amplitude of the received RF test signal, or both, or it may include other data.

Figure 4:
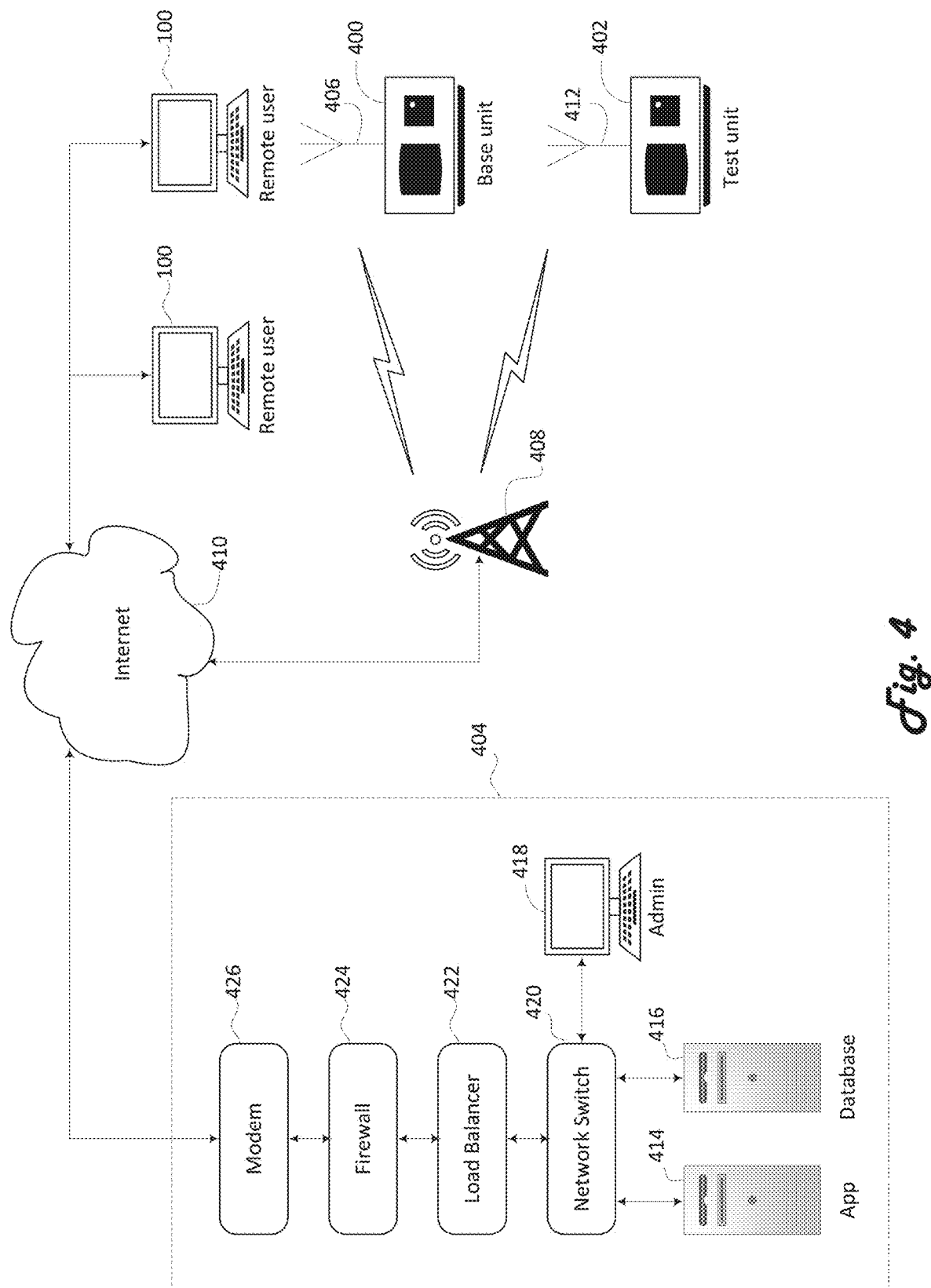
FIG. 4 is a block diagram of an embodiment of a networked RF certification system.

An embodiment of a networked RF certification system is depicted in FIG. 4. A base unit 400 and a test unit 402 communicate with a computer network 404 that stores data respecting signal strengths and grid locations. The base unit 400 includes a base antenna 406. RF signals propagate between the base antenna 406 and a system antenna 408 that may be located nearby or at a distance. The system antenna 408 in turn is connected to the network 404, for example through the Internet as represented by a cloud 410. The RF signals may be of any wavelength of interest; for example, in some embodiments they may be VHF or UHF, in other embodiments they may be microwaves, and other embodiments they may be of other wavelengths.

The test unit 402 includes a test antenna 412, and signals propagate between the test antenna 412 and the system antenna 408. In some embodiments the base unit 400 communicates with the Internet through one system antenna, and the test unit 402 communicates with the Internet through a different system antenna. In some embodiments, one or both of the base unit 400 and the test unit 402 connect to the Internet through a wired connection such as an Ethernet cable.

The network 404 may include one or more application servers 414, one or more database servers 416, and a system administrator 418. The network 404 communicates with the Internet through, in turn, a network switch 420, a load balancer 422, a firewall 424, and a modem 426.

In operation, the test unit 402 is disposed in an untested sector in a building being tested for RF certification. The test unit 402 transmits an RF test signal to the base unit 400. The base unit 400 evaluates the test signal according one or more predetermined criteria such as quality of an analog signal carried by the test signal, data carried by the test signal, or signal strength of the test signal as received. The base unit 400 sends data respecting its evaluation of the test signal to the network 404 through any suitable wired or wireless connection. Either the base unit 400 or the test unit 402 sends data identifying the sector to the network 404. The base unit 400 may send reply signal to the test unit 402, which in turn evaluates the received reply signal and sends data respecting the signal to the network 404. The network 404 stores the data and at some convenient time, for example after all sectors have been tested, prepares a report indicating the quality of transmission, reception, or both, of RF signals in each sector.

Figure 5:
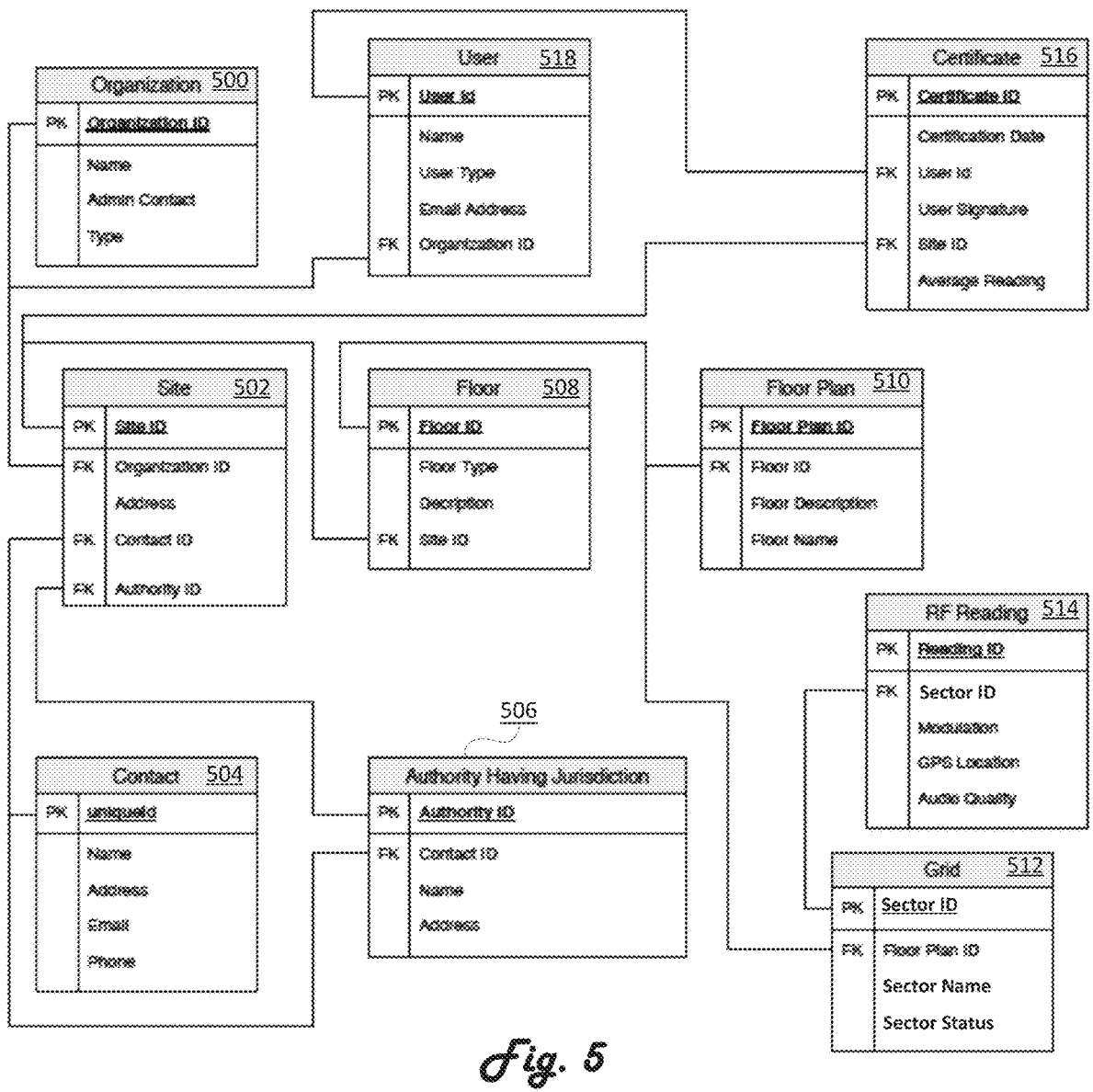
FIG. 5 is an embodiment of a database schema for methods and systems of RF certification of structures.

FIG. 5 shows a database schema, as used in some embodiments, of data respecting signals at various sectors within a structure. An Organization field 500 includes organization ID, name, admin contact, and type. A Site field 502 includes site ID, organization ID from the Organization field 500, address, contact ID from a Contact field 504, and authority ID from an Authority-Having-Jurisdiction field 506. The Contact field 504 includes the contact ID, name, address, Email, and phone. The Authority-Having-Jurisdiction field 506 includes the authority ID, contact ID from the Contact field 504, name, and address. A Floor field 508 includes floor ID, floor type, description, and site ID from the Site field 502. A Floor-Plan field 510 includes floor plan ID, floor ID from the Floor field 508, floor description, and floor name. A Grid field 512 includes grid ID, floor plan ID from the Floor field 508, grid name, and grid status. An RF-Reading field 514 includes reading ID, grid ID from the Grid field 512, modulation, GPS location, and audio quality. A Certificate field 516 includes certificate ID, certification date, user ID from a User field 518, user signature, site ID from the Site field 502, and average reading. The User field 518 includes user ID, name, user type, email address, and organization ID from the Organization field 500.

Figure 6:
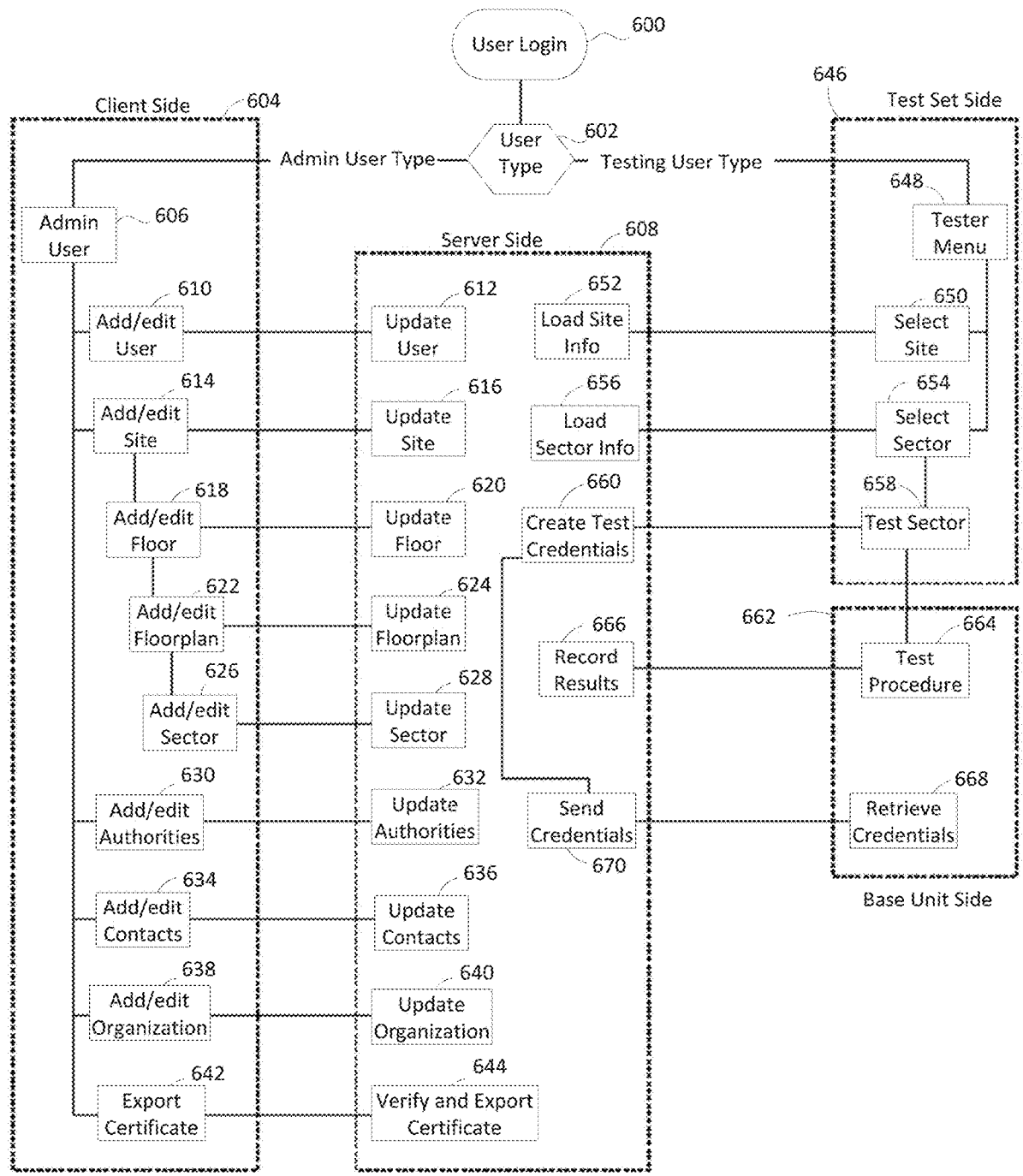
FIG. 6 is a functional block diagram of aspects of the system of FIG. 4.

FIG. 6 illustrates functions that may be included in an embodiment of an RF certification system. A user may login 600 indicating a User Type 602 as Administrative User or Testing User. On a client side 604, an Administrative User accesses an admin menu 606. From this menu 606 the user may use various functions to add or update data on a server side 608. Examples of these functions may include:

a) an Add/Edit Users function 610 to update user data 612;
b) an Add/Edit Sites function 614 to update sites data 616; the function 614 in turn can access an Add/Edit Floors function 618 to update Floors data 620, an Add/Edit Floorplan function 622 to update Floorplan data 624, and an Add Grids function 626 to update Grids data 628;
c) an Add/Edit Authorities function 630 to update Authorities data 632;
d) an Add/Edit Contacts function 634 to update Contacts data 636;
e) an Add/Edit Organization function 638 to update Organization data 640; and
f) an Export Certificate function 642 to verify and export a Certificate 644.

On a test unit side 646, a Testing User accesses a tester menu 648. From this menu 648 the user may use various functions related to data on server side 608. Examples of these functions may include a Select Site function 650 to load Site Info data 652 and a Select Grid function 654 to load Grid Info data 656. The function 654 in turn can access a Test Grid function 658 to create Test Credentials data 660.

On a Base unit side 662, from the Test Grid function 658 the user can proceed to a Test Procedure function 664 to access Results data 666. The user can also proceed to a Retrieve Credentials function 668 to send credentials 670 based on the test credentials created at 660.

Figure 7:
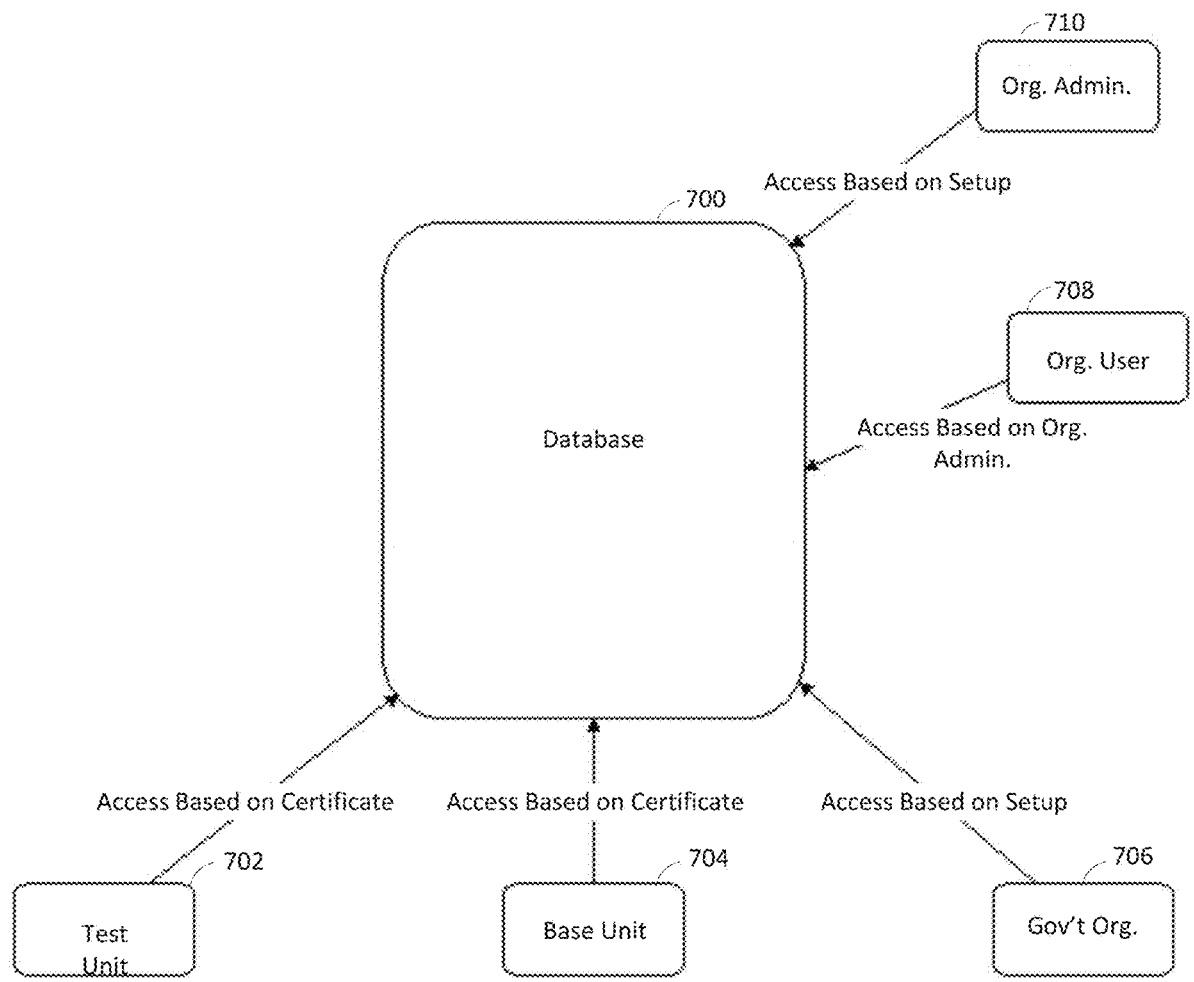
FIG. 7 is a block diagram of an embodiment of a method of controlling access to test results in methods and systems of RF certification of structures.

FIG. 7 shows a database 700 that includes sites, test results for each site, certificates of testing, and three access criteria:

(1) specially signed certificate issued by a secure digital certificate authority,
(2) verified account through setup process, and
(3) verified account by organization administrator.

The first criterion provides for access by the test unit 702 and by the base unit 704. The second provides for access by a government organization 706. The third provides for access by an organization user 708 or an organization administrator 710.

Figure 8:
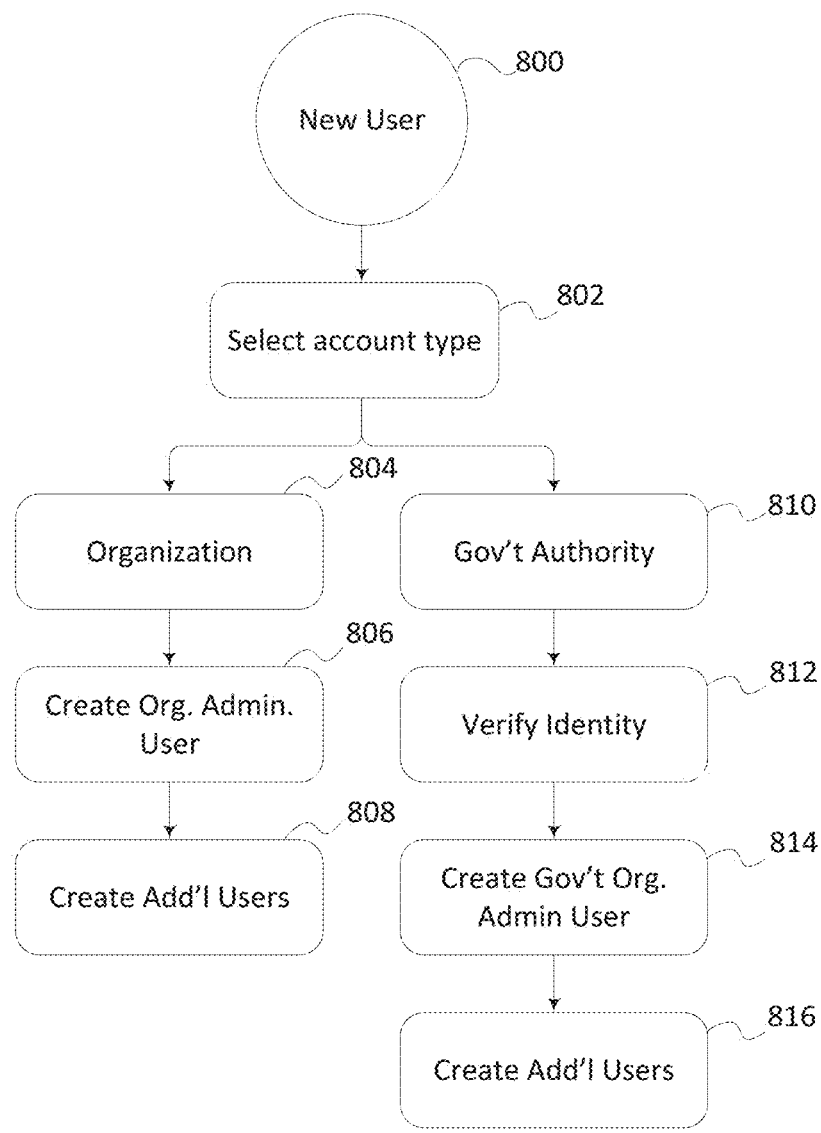
FIG. 8 is a flowchart of an embodiment of an account setup process in methods and systems of RF certification of structures.

FIG. 8 is a flowchart of an embodiment of an account setup process. A new user requests access 800. The new user selects an account type 802. If the selected account type is "organization" 804, an organization administrator user is created 806 and additional users and roles are created and assigned to the organization 808. If the selected account type is "governmental authority having jurisdiction" 810, the identity of the governmental organization is verified 812, a governmental organization administrator is created 814, and additional users and roles are created and assigned to the organization 816.

Figure 9:
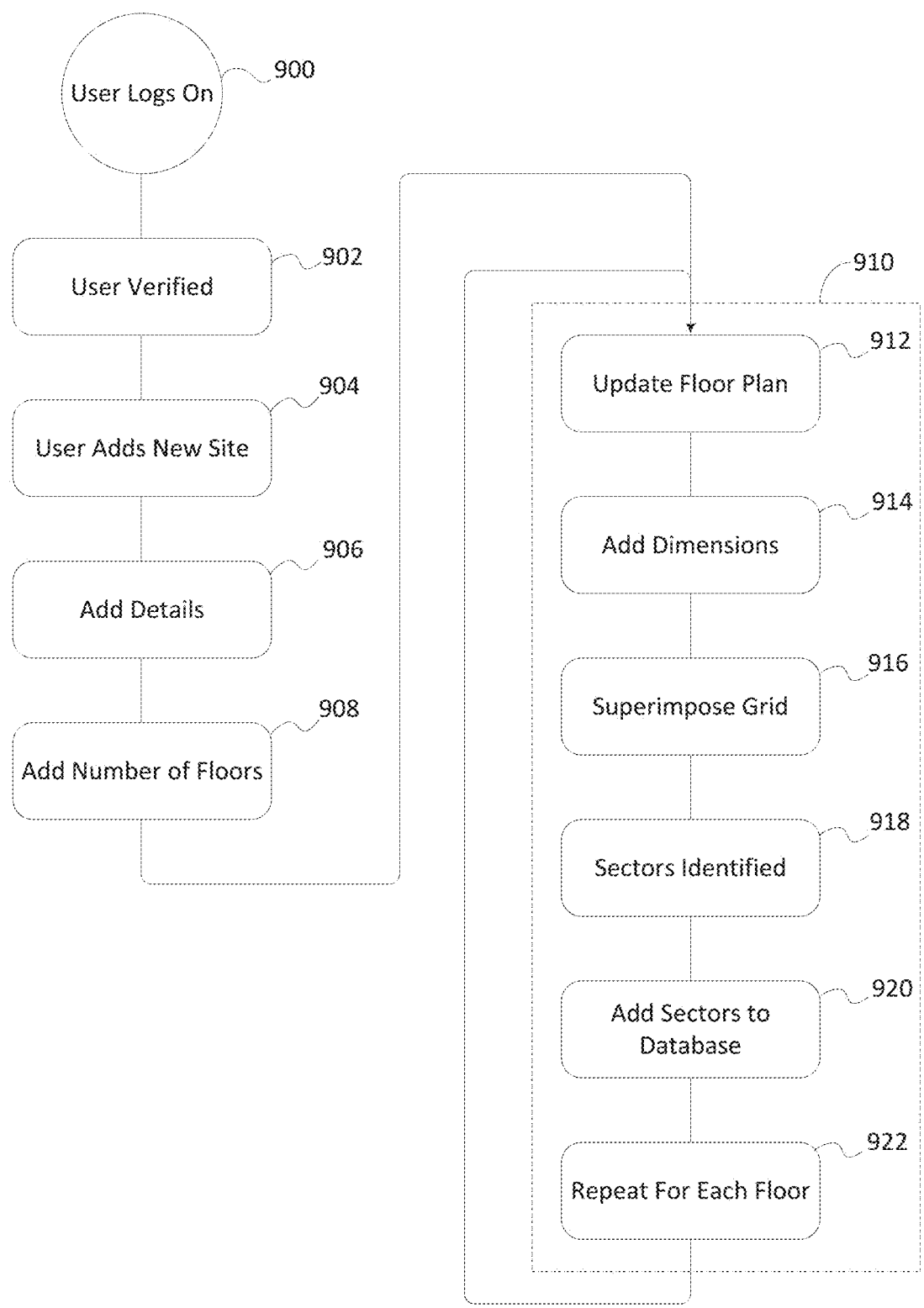
FIG. 9 is a flowchart of an embodiment of a site setup process for methods and systems of RF certification of structures.

FIG. 9 shows an embodiment of a site setup process. A user logs into the site 900 and user identity and roles are validated 902. The user adds a new site to the account 904, specific details of the site are added 906, and the number of floors of the building is added 908. For each floor 910, the floor plan is uploaded 912, dimensions are added to the floor plan 914, a grid is superimposed on the floor plan 916, each grid sector is given a unique identifier 918, and the sectors are added to the database 920. This process is repeated 922 for each floor.

Figure 10:
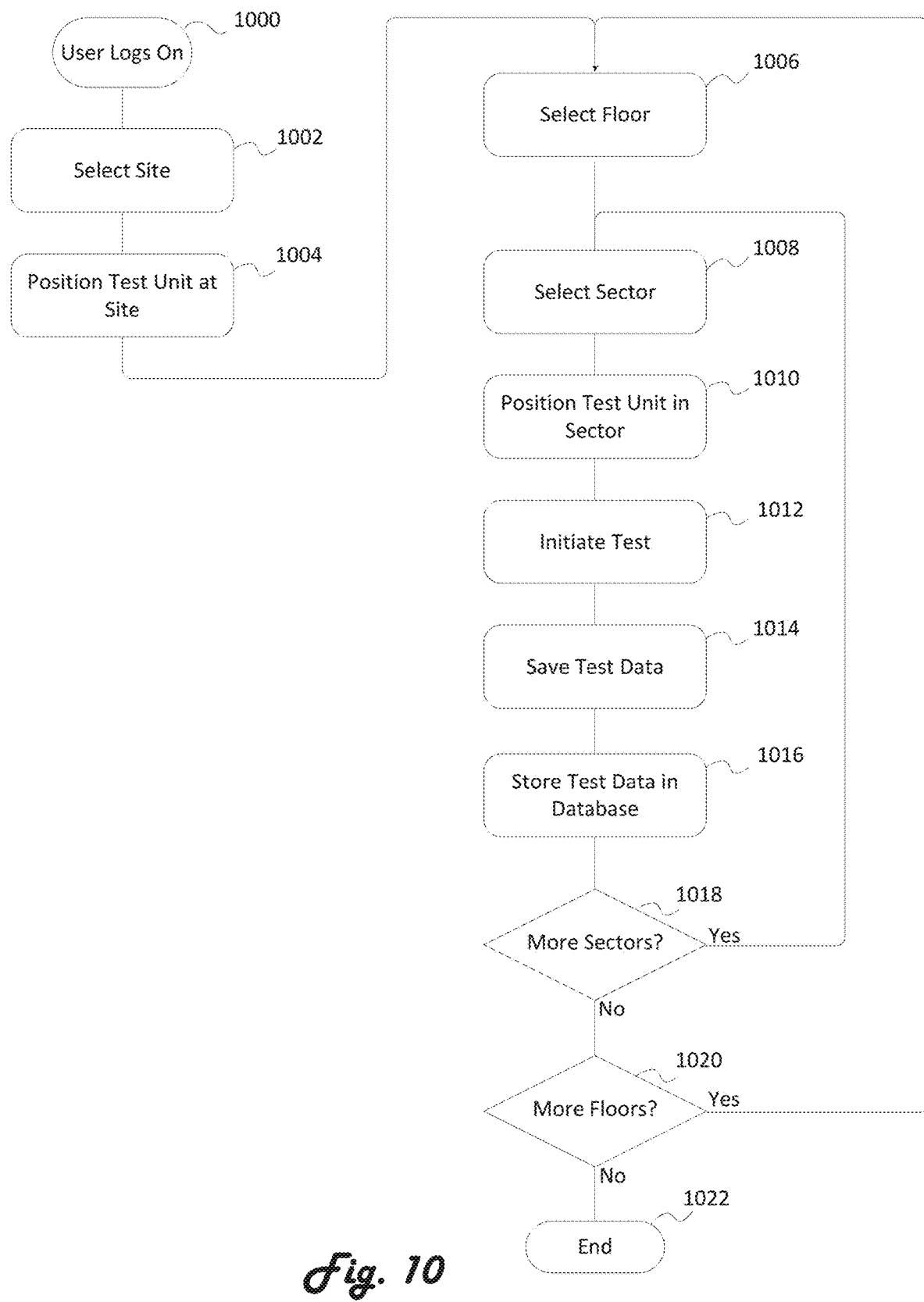
FIG. 10 is a flowchart of an embodiment of a site testing process for method and systems of RF certification of structures.

FIG. 10 depicts an embodiment of a process of testing RF reception in a structure. A user logs on 1000 and selects a site 1002. The user positions 1004 a test unit at the site. The user selects a floor 1006. The user selects a sector 1008 in the grid overlying the floor plan for the selected floor. The user positions 1010 the test unit in the selected sector and initiates 1012 a test. During the test, the test unit sends a signal to the base unit and receives a signal from the base unit. Test data are saved 1014 and stored 1016 in the central database. If more grid sectors remain to be tested 1018, the process repeats beginning with selecting a sector 1008. This continues until every sector on the floor has been tested. If more floors remain to be tested 1020, the process repeats, beginning with selecting a floor 1006, until every floor has been tested, at which point the process ends 1022.

Figure 11:
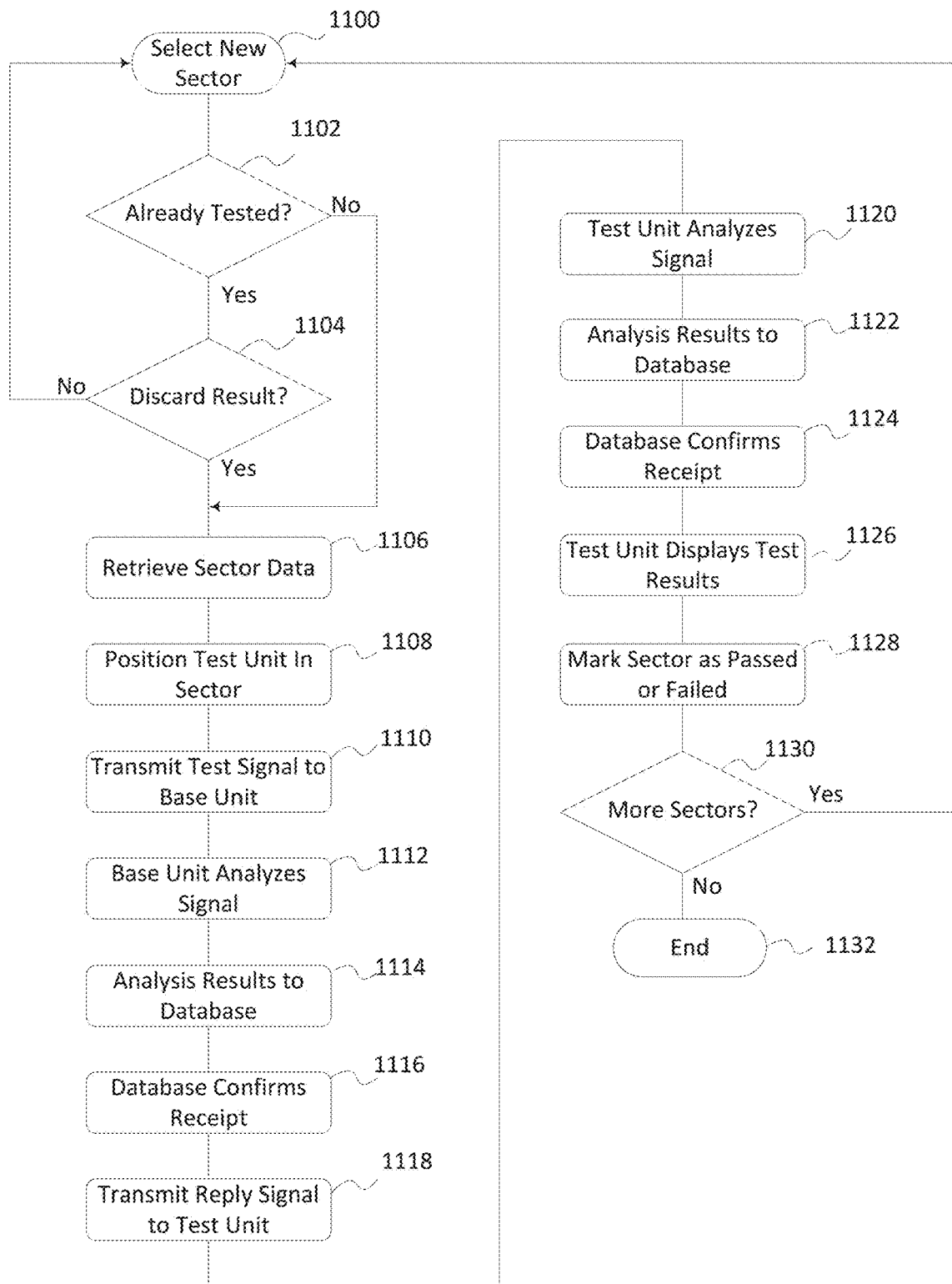
FIG. 11 is a flowchart of an embodiment of a sector testing process for methods and systems of RF certification of structures.

FIG. 11 illustrates an embodiment of a sector test process. A user selects 1100 a sector for testing. In some embodiments the user may select a sector that has already been tested. If the sector has not been tested 1102, the test proceeds. If the sector has been tested, the user may discard 1104 the test result and re-test the sector, or the user may return to selecting 1100 another sector. Next, sector data is retrieved 1106 from the database. The test unit is positioned 1108 in the sector to be tested. The test unit transmits 1110 an RF test signal to the base unit. The base unit analyzes 1112 the received RF test signal. The analysis may include measuring the signal strength of the test signal, checking the quality of an analog signal carried by the test signal, checking the accuracy (error rate) of data encoded in the test signal, or measuring other signal parameters as desired. The base unit sends 1114 test results to the database, and the database confirms 1116 receiving the test data. In some embodiments the base unit thereupon sends 1118 an RF reply signal to the test unit. The test unit analyzes 1120 the received reply signal using the same or different criteria as were used by the base unit in analyzing the received test signal. The test unit sends 1122 the test results to the database, and the database confirms 1124 receiving the test results. In some embodiments the test unit displays 1126 the test results. The test unit may display only the result of the test that it conducts on the received reply signal, or it may also display the results of the base unit analysis of the test signal which may be obtained either from the base unit or from the database. The sector is marked 1128 as passed or failed, and if there are no more sectors to test 1130, the process ends 1132. If there are more sectors to test, the process is repeated.

Figure 12:
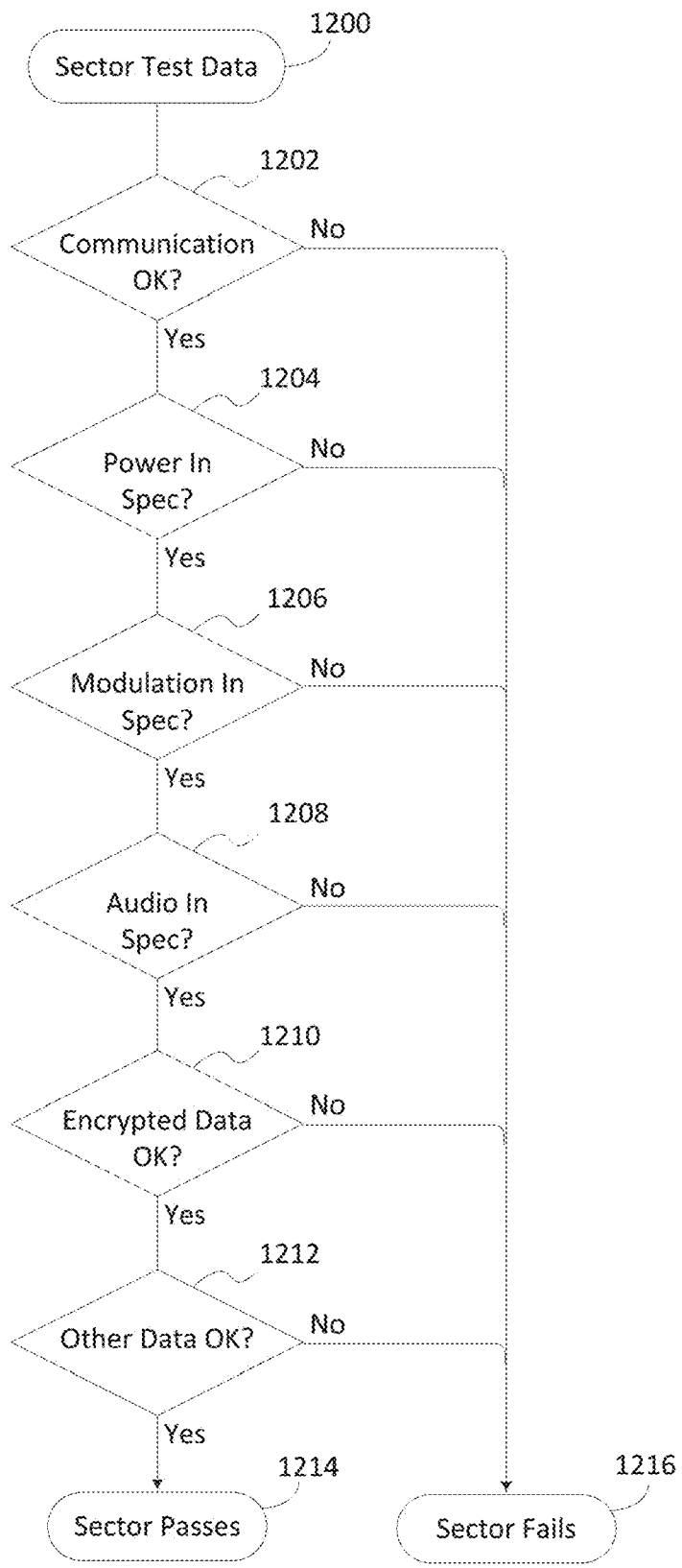
FIG. 12 is a flowchart of an embodiment of analysis of sector test results for methods and systems of RF certification of structures.

FIG. 12 shows an embodiment of an analysis of sector test results. Sector test data are obtained 1200. If the RF communication was successful 1202, and if the RF power in the received signal was within specs 1204, and if modulation was within specs 1206, and if the audio test signal was within specs 1208, and if the encrypted data was within specs 1210, and if any other required signal was within specs 1212, the sector passes the test 1214, otherwise the sector fails the test 1216.

Figure 13:
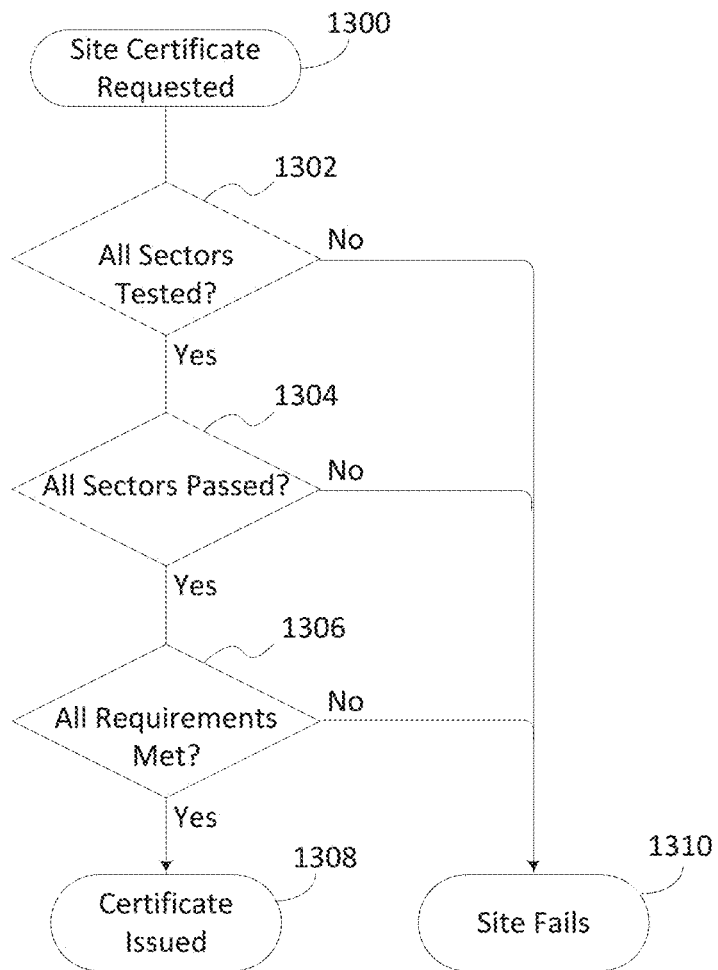
FIG. 13 is a flowchart of an embodiment of a site certification process for methods and systems of RF certification of structures.

FIG. 13 depicts an embodiment of a site certification process. A user submits a site certification request 1300. If all sectors on all floors were tested 1302, and if all sectors passed 1304, and if any other requirements were met 1306, the site receives a certificate 1308. The site fails 1310 if not all sectors were tested (incomplete test), or if not all sectors passed the test, or if any other requirements were not met.

Figure 14:
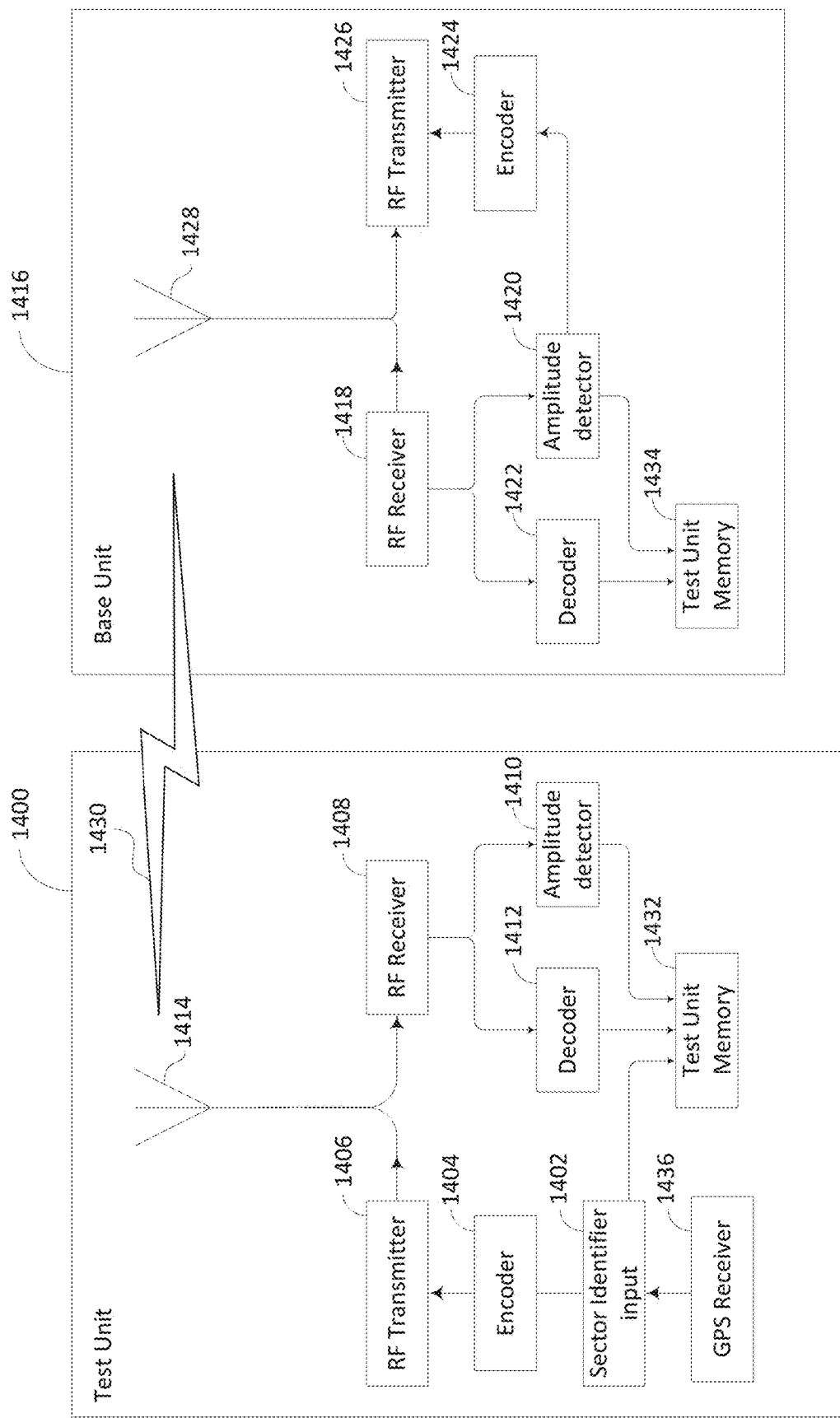
FIG. 14 is a block diagram of an embodiment of an RF certification system.

An embodiment of an RF certification system is depicted in FIG. 14. A test unit 1400 has a sector-identifier input 1402, a test digital encoder 1404 in communication with the sector identifier input 1402, a test RF transmitter 1406 in communication with the test digital encoder 1404, a test RF receiver 1408, a test amplitude detector 1410 in communication with the test RF receiver 1408, and a test digital decoder 1412 in communication with the test RF receiver 1408. The test RF transmitter 1406 and the test RF receiver 1408 share an RF antenna 1414, although in some embodiments separate antennas may be used for the transmitter and receiver. A base unit 1416 includes a base RF receiver 1418, a base amplitude detector 1420 in communication with the RF receiver 1418, a base digital decoder 1422 in communication with the RF receiver 1418, a base digital encoder 1424 in communication with the amplitude detector 1420, and a base RF transmitter 1426 in communication with the base digital encoder 1424. The base RF transmitter 1426 and the base RF receiver 1418 share an RF antenna 1428, although in some embodiments separate antennas may be used for the transmitter and receiver.

RF communication takes place between the test unit 1400 and the base unit 1416 as indicated symbolically by a lightning bolt 1430.

The test unit 1400 is operative to transmit a test signal encoded with a sector identifier, receive a reply signal encoded with test signal amplitude information, and detect amplitude (signal strength) of the received reply signal. The base unit 1416 is operative to receive the test signal, detect amplitude (signal strength) of the received test signal, and transmit a reply signal encoded with the amplitude of the received test signal.

The test unit 1400 may include a memory 1432 in communication with the sector identifier input 1402 and the test digital decoder 1412. In some embodiments the memory 1432 is also in communication with the amplitude detector 1410. The base unit 1416 may include a base memory 1434 in communication with the base amplitude detector 1420 and the base digital decoder 1422.

The test unit 1400 may store the sector identifier and the test signal amplitude information in the test memory 1432. The base unit 1416 may store the sector identifier information as received from the decoder 1422 and the test signal amplitude in the base memory 1434.

In some embodiments the test unit 1400 includes a GPS receiver 1436. The GPS receiver determines the location of the test unit, for example which sector the test unit occupies, and provides this information as an input to the sector identifier input 1402.

In some embodiments the test unit 1400 or the base unit 1416 or both may have an Ethernet or other wired connection for communicating with a remotely-located server that may include a central database. The test unit 1400 or the base unit 1416 or both may have Wifi, mobile telephone, or other wireless communication facilities for the same purpose.

Figure 15:
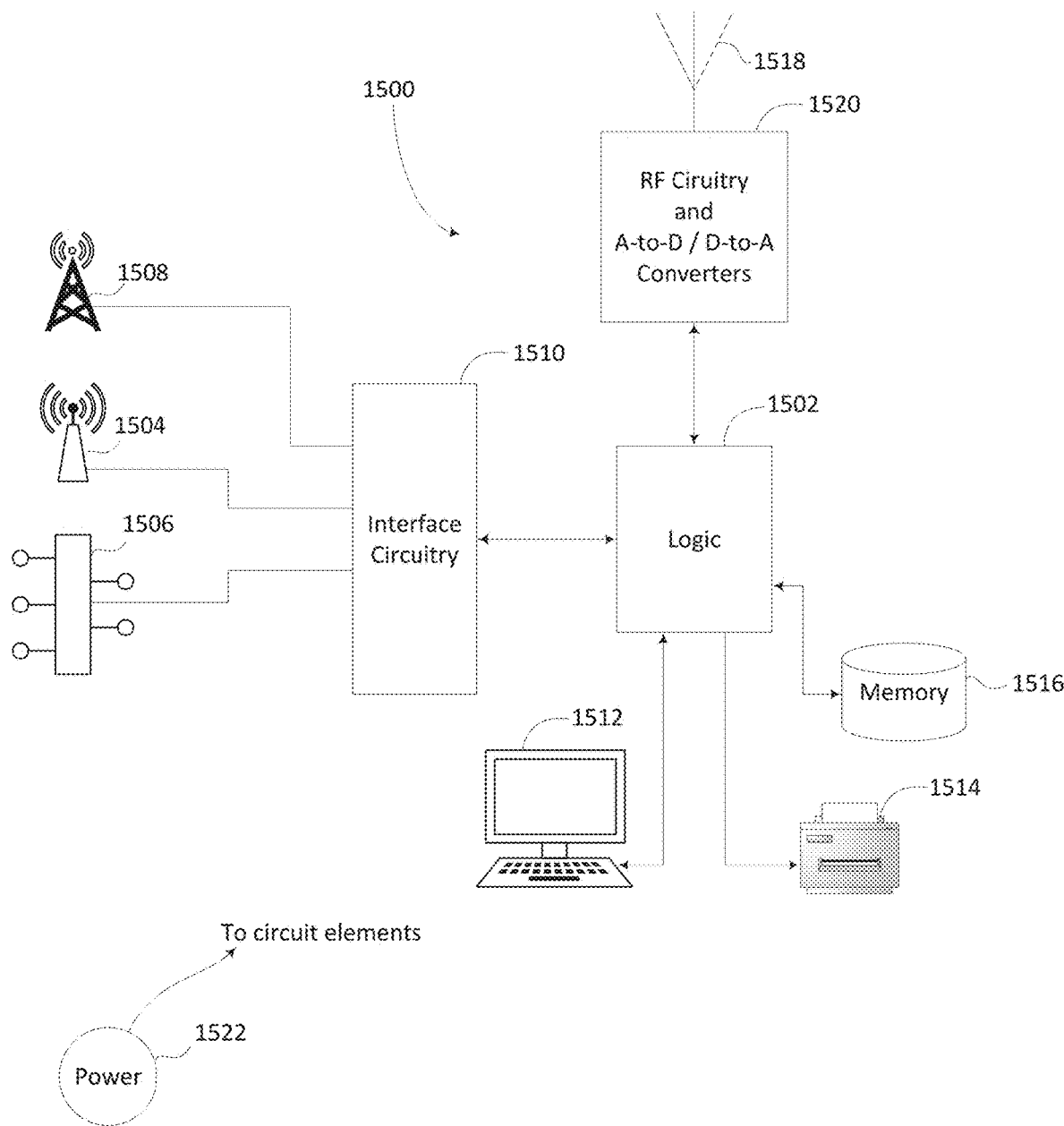
FIG. 15 is a block diagram of an embodiment of a base unit of an RF certification system.

FIG. 15 illustrates another embodiment of a base unit generally 1500. A logic module 1502 may exchange control and data signals with a central database or with a user through, for example, any or all of a cellular data antenna 1504, an Ethernet port 1506, and a Wi-Fi antenna 1508. These communication devices may communicate with the logic module 1502 through appropriate interface circuitry 1510. Some embodiments may not have all of these kinds of communication facilities, and some may have other kinds. Some embodiments include a user terminal 1512 or a printer 1514 or both in communication with the logic module 1502. A memory 1516 may be provided for local storage of information respecting test signals received by the base unit.

An RF antenna 1518 that can exchange RF test and reply signals with a test unit communicates with the logic module 1502 through RF circuitry 1520. The RF circuitry 1520 may include an element for protecting against damage from lightning or static electric charges. The RF circuitry includes an RF receiver that can receive test signals, an RF transmitter that can transmit reply signals, analog-to-digital and digital-to-analog circuit elements to facilitate transmission and reception of digital signals, a modulator that can modulate a reply signal with an analog signal, and a demodulator that can recover an analog signal from a received test signal. A power source 1522 which may include battery or mains power or both provides operating power to the various elements of the base unit.

Figure 16:
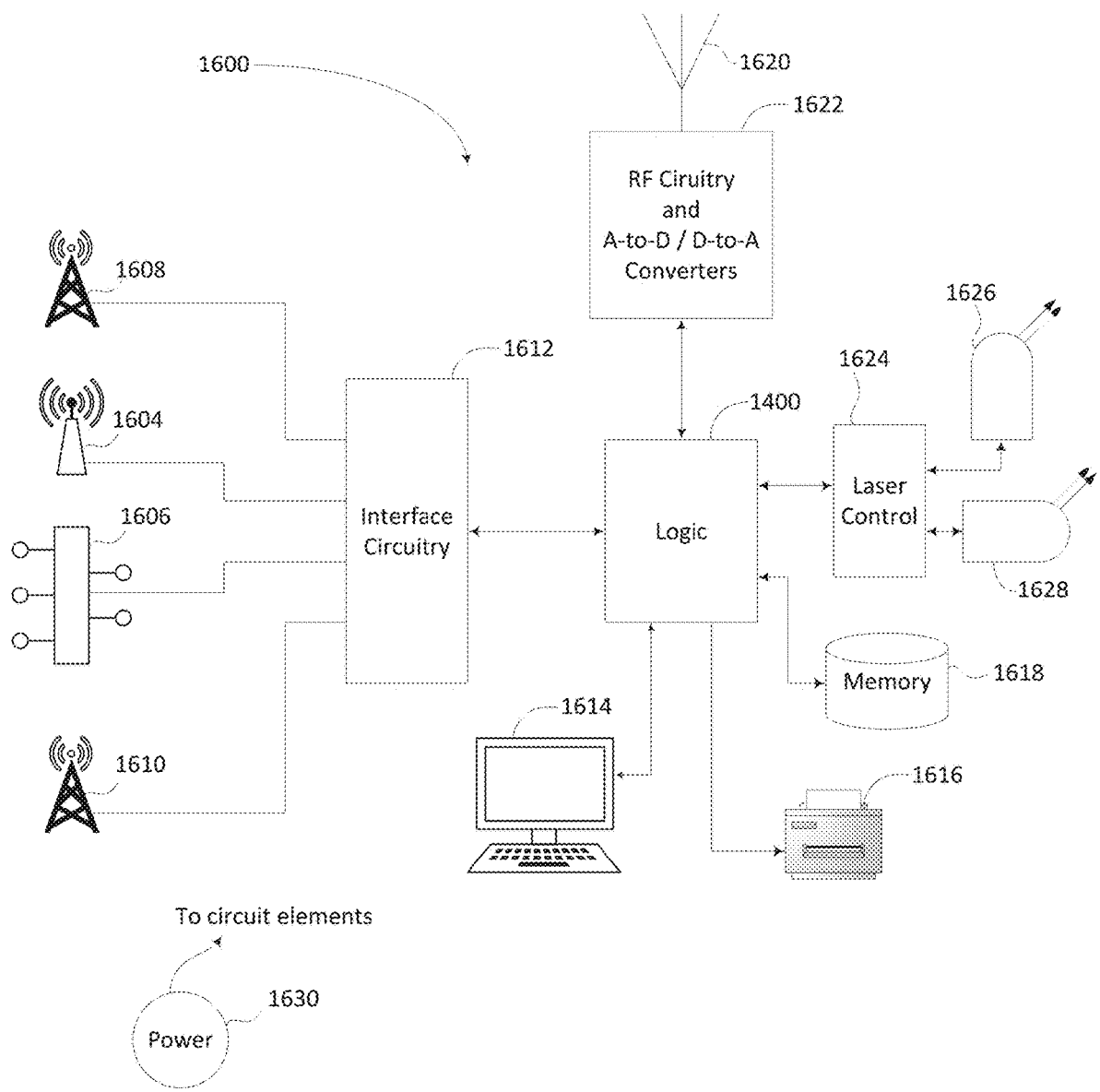
FIG. 16 is a block diagram of an embodiment of a test unit of a RF certification system.

FIG. 16 illustrates another embodiment of a test unit generally 1600. A logic module 1602 may exchange control and data signals with a central database or with a user through, for example, any or all of a cellular data antenna 1604, an Ethernet port 1606, a Wi-Fi antenna 1608, and a GPS unit 1610. These communication devices may communicate with the logic module 1602 through appropriate interface circuitry 1612. Some embodiments may not have all of these kinds of communication facilities, and some may have other kinds. Some embodiments include a user terminal 1614 or a printer 1616 or both in communication with the logic module 1602. A memory 1618 may be provided for local storage of information respecting reply signals received by the test unit 1600.

An RF antenna 1620 that can exchange RF test and reply signals with a base unit communicates with the logic module 1602 through RF circuitry 1622. The RF circuitry 1622 may include an element for protecting against damage from lightning or static electric charges. The RF circuitry includes an RF receiver that can receive test signals, an RF transmitter that can transmit reply signals, analog-to-digital and digital-to-analog circuit elements to facilitate transmission and reception of digital signals, a modulator that can modulate a reply signal with an analog signal, and a demodulator that can recover an analog signal from a received test signal.

Some embodiments include a laser measurement system 1624, including X-axis and Y-axis lasers 1626 and 1628, in communication with the logic module 1602. The laser measurement system 1624 may be used to assist in locating the test unit 1600 precisely in a sector to be tested, or for determining dimensions of the surroundings, or the like.

A power source 1630 which may include battery or mains power or both provides operating power to the various elements of the test unit.

Figure 17A:
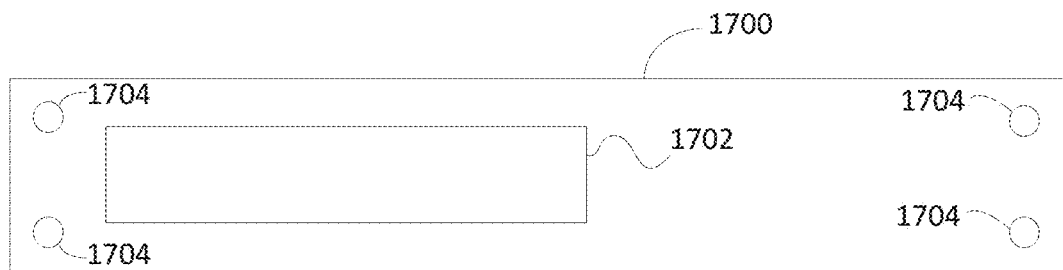
FIG. 17A is a front view of a control panel of the base unit of FIG. 14
Figure 17B:
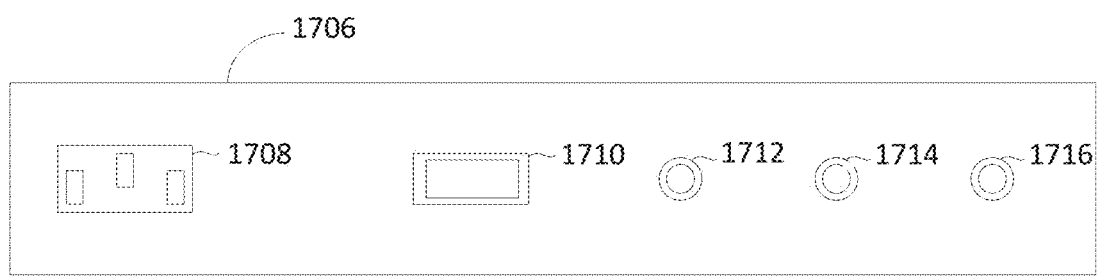
FIG. 17B is a rear view of the base unit of FIG. 14.

FIGS. 17A and 17B illustrate the exterior of an embodiment of a base unit such as the one depicted in FIG. 14. A front panel 1700 includes an LCD display 1702. Some embodiments may also include a keyboard or user-operable buttons or switches (not shown). Mounting holes 1704 may be used to install the base unit in a rack mount system. A rear panel 1706 includes a mains power input receptacle 1708 (for example, 120 volts AC), an Ethernet port 1710, a port 1712 for an external Wi-Fi antenna, a port 1714 for a GPS antenna, and a port 1716 for an RF antenna. Some embodiments may also include a port for a cellular data antenna. Some or all of these antennas may be contained internally within the base unit, and a port would not be provided for any such antenna.

Figure 18:
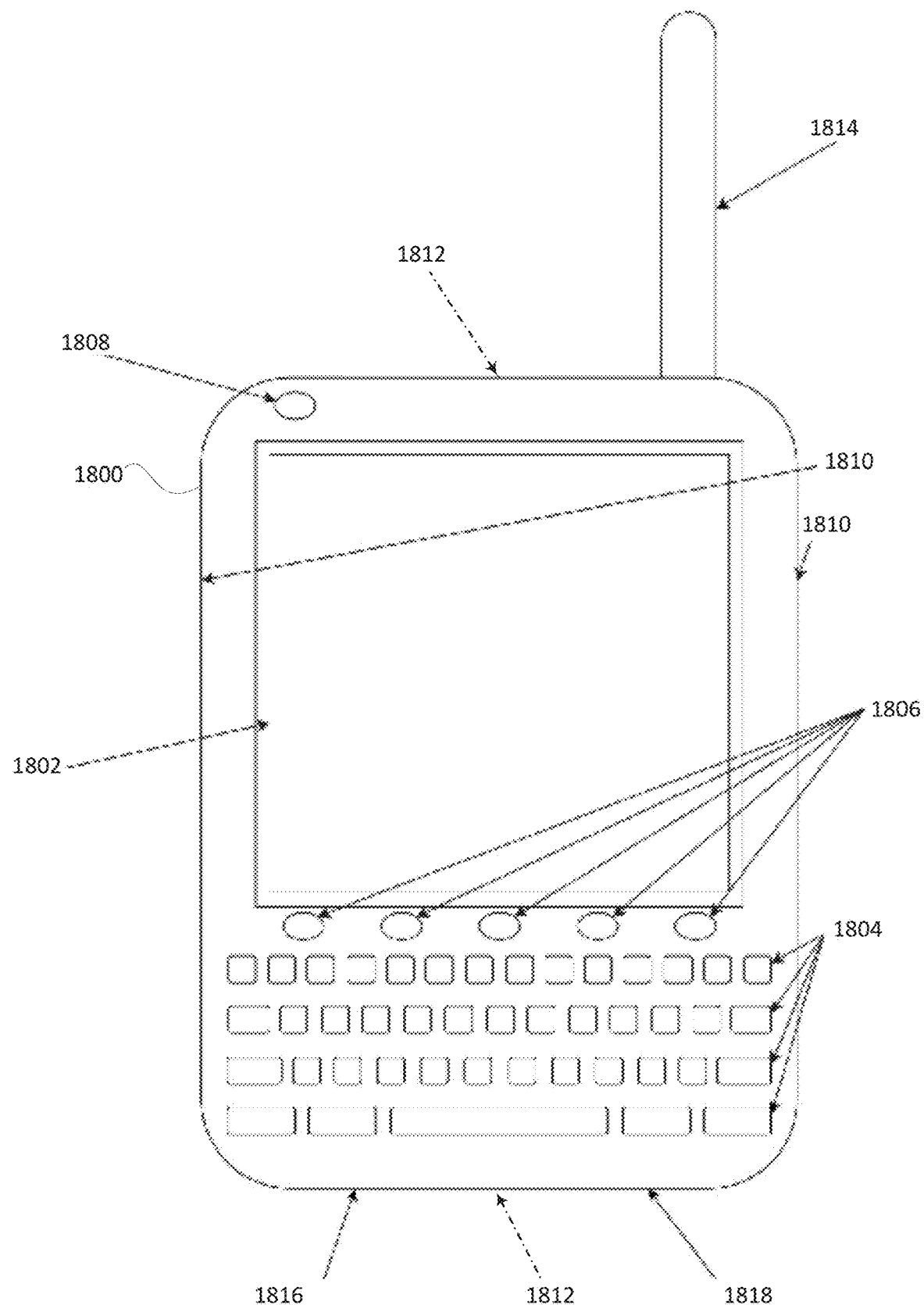
FIG. 18 is a front view of the test unit of FIG. 14.

FIG. 18 shows the exterior of an embodiment of a test unit such as the one depicted in FIG. 14. A front panel 1800 includes a visual display 1802, for example an LCD display. The front panel 1800 includes a keyboard 1804; function buttons 1806; and a power control button 1808; in other embodiments some of these may be omitted or may be replaced by other kinds of user-operable controls. In some embodiments the display 1802 may comprise a touch-screen display, and any or all of the keyboard 1804, function buttons 1806, and power control button 1808 may be omitted. An X-axis laser 1810 and a Y-axis laser 1812 may be disposed on an edge of the unit or on the underside. An RF antenna 1814 is disposed on an upper side of the unit although in some embodiments the RF antenna may be enclosed in the unit. The test unit may include an internal battery back (not shown), a battery connection port 1816, or a mains power connection port 1818.

The foregoing is a detailed description of some aspects and embodiments; it is not intended to be limiting. Other embodiments are possible and within the skill of those in the art. The invention is to be limited only by the claims as finally allowed.

I claim:

1. An RF certification system comprising:
   a test unit having
      a sector-identifier input,
      a test digital encoder in communication with the sector identifier input,
      a test RF transmitter in communication with the test digital encoder to transmit a test signal encoded with a sector identifier from the sector-identifier input,
      a test RF receiver to receive a reply signal encoded with test signal amplitude information,
      a test amplitude detector in communication with the test RF receiver to detect strength of the received reply signal, and
      a test digital decoder in communication with the test RF receiver; and
   a base unit having
      a base RF receiver,
      a base amplitude detector in communication with the RF receiver,
      a base digital decoder in communication with the RF receiver,
      a base digital encoder in communication with the amplitude detector, and
      a base RF transmitter in communication with the base digital encoder.

2. The RF certification system of claim 1 and further comprising a test memory in communication with the sector identifier input and the test digital decoder to store the sector identifier and the test signal amplitude information.

3. The RF certification system of claim 1 and further comprising a base memory in communication with the base amplitude detector and the base digital decoder.

4. The RF certification system of claim 1 wherein the test unit comprises a GPS receiver.

\* \* \* \* \*